US012571952B2

(12) United States Patent
Kim et al.

(10) Patent No.: US 12,571,952 B2
(45) Date of Patent: Mar. 10, 2026

(54) POLARIZING PLATE AND OPTICAL DISPLAY DEVICE INCLUDING SAME

(71) Applicant: SAMSUNG SDI CO., LTD., Yongin-si (KR)

(72) Inventors: Bong Choon Kim, Suwon-si (KR); Jung Hun You, Suwon-si (KR); Jun Mo Koo, Suwon-si (KR); Dong Yoon Shin, Suwon-si (KR); Sang Hum Lee, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 661 days.

(21) Appl. No.: 17/757,874

(22) PCT Filed: Dec. 22, 2020

(86) PCT No.: PCT/KR2020/018854
§ 371 (c)(1),
(2) Date: Jun. 22, 2022

(87) PCT Pub. No.: WO2021/141289
PCT Pub. Date: Jul. 15, 2021

(65) Prior Publication Data
US 2023/0035051 A1     Feb. 2, 2023

(30) Foreign Application Priority Data
Jan. 7, 2020     (KR) ......................... 10-2020-0002277

(51) Int. Cl.
G02B 5/30          (2006.01)
(52) U.S. Cl.
CPC ................................. G02B 5/3025 (2013.01)

(58) Field of Classification Search
CPC ...... G02B 5/30; G02B 5/3025; G02B 5/3008; G02B 5/3016; G02B 5/3033; G02B 5/305; G02B 27/28; G02F 1/133528
See application file for complete search history.

(56) References Cited

U.S. PATENT DOCUMENTS

| 2009/0244474 A1 | 10/2009 | Fuchida et al. |
| 2012/0106063 A1 | 5/2012 | Mathew et al. |

(Continued)

FOREIGN PATENT DOCUMENTS

| KR | 10-2009-0105823 A | 10/2009 |
| KR | 10-2017-0037855 A | 4/2017 |

(Continued)

OTHER PUBLICATIONS

Gil, et al., "Depolarization and polarization indices of an optical system", Optica Acta, 1986, vol. 33, No. 2, pp. 185-189 (Year: 1986).*

(Continued)

*Primary Examiner* — Stephone B Allen
*Assistant Examiner* — Adam W Booher
(74) *Attorney, Agent, or Firm* — Ricky Lam

(57)          ABSTRACT

Provided are a polarizing plate and an optical display device including same, the polarizing plate comprising a polarizer and a protection film formed on at least one surface of the polarizer, wherein the polarizer includes, in at least a part thereof, an area having high light transmittance, and the area having the high light transmittance has a depolarization index that is less than or equal to approximately 2% in a wavelength of approximately 550 nm.

6 Claims, 1 Drawing Sheet

(56)                    References Cited

U.S. PATENT DOCUMENTS

| | | | |
|---|---|---|---|
| 2016/0195767 A1* | 7/2016 | Lee | B29C 71/04 |
| | | | 359/486.01 |
| 2016/0313480 A1 | 10/2016 | Lee et al. | |
| 2016/0377777 A1* | 12/2016 | Lee | B29D 11/00865 |
| | | | 264/1.34 |
| 2017/0090087 A1 | 3/2017 | Goto et al. | |

FOREIGN PATENT DOCUMENTS

| | | |
|---|---|---|
| KR | 10-2017-0083995 A | 7/2017 |
| KR | 10-2017-0122167 A | 11/2017 |
| KR | 10-2018-0081197 A | 7/2018 |
| KR | 10-2019-0109367 A | 9/2019 |

OTHER PUBLICATIONS

International Search Report of PCT/KR2020/018854, Apr. 9, 2021, 6 pages.
Korean Office Action dated Nov. 4, 2022 issued in corresponding Korean Patent Application No. 10-2020-0002277.

* cited by examiner

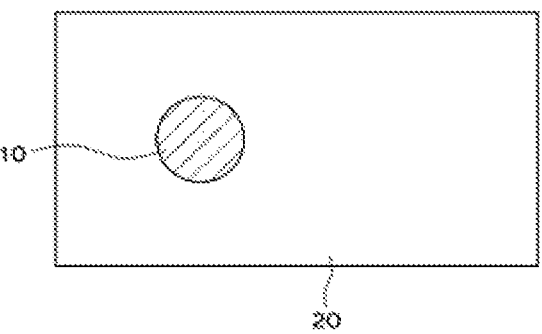

POLARIZING PLATE AND OPTICAL DISPLAY DEVICE INCLUDING SAME

CROSS-REFERENCE TO RELATED APPLICATIONS

This application is a U.S. National Phase Patent Application of International Application Number PCT/KR2020/018854, filed on Dec. 22, 2020, which claims priority to Korean Patent Application Number 10-2020-0002277, filed on Jan. 7, 2020, the entire content of each of which is incorporated herein by reference.

TECHNICAL FIELD

The present invention relates to a polarizing plate and an optical display including the same. More particularly, the present invention relates to a polarizing plate which has a high light transmittance region allowing an image photographed therethrough to have improved color quality and clarity, and an optical display including the same.

BACKGROUND ART

A polarizing plate serves to emit polarized light through polarization of light emitted from a liquid crystal panel of an optical display. The polarizing plate includes a polarizer and a protective film laminated on at least one surface of the polarizer. In general, an optical display has various functions, such as a camera function and a video call function, as well as a display function. Since the polarizing plate transmits only less than 50% of incident light due to a polarization function thereof, the polarizing plate disposed in a camera region can cause deterioration in visibility. In order to solve such a problem, it is necessary to form a high light transmittance region at at least part of the polarizing plate.

Recently, portable electronic devices including smartphones and smartpads are equipped with various functions. In particular, a camera is an essential component of a smartphone. In order to add a camera function to a smartphone, a camera part must be present on a front side of the smartphone. With gradual increase in screen-to-body ratio, the camera portion is placed in a screen region, that is, in a display region. Currently, no images are displayed on the camera part placed inside the screen region. Accordingly, a method is under development to allow a screen not to be displayed on a light-receiving portion of a camera upon photographing with the camera while allowing display of the screen on the light-receiving portion at other times. However, in this case, even when the polarizing plate has a high light transmittance region, there is a limitation in improving color quality and clarity of an image photographed through the high light transmittance region.

DISCLOSURE

Technical Problem

It is an object of the present invention to provide a polarizing plate which has a high light transmittance region allowing an image photographed therethrough to have improved color quality and clarity.

Technical Solution

One aspect of the present invention relates to a polarizing plate.

1. The polarizing plate includes: a polarizer; and a protective film formed on at least one surface of the polarizer, wherein the polarizer has a high light transmittance region formed at at least a portion thereof, the high light transmittance region having a depolarization index of about 2% or less at a wavelength of about 550 nm.

2. In embodiment 1, the high light transmittance region may have a light transmittance of about 60% to about 92%.

3. In embodiments 1 and 2, the high light transmittance region may be placed on a camera disposed in a display region of an optical display.

Another aspect of the present invention relates to an optical display including the polarizing plate according to the present invention.

Advantageous Effects

The present invention provided a polarizing plate which has a high light transmittance region allowing an image photographed therethrough to have improved color quality and clarity.

DESCRIPTION OF DRAWINGS

FIG. 1 is a plan view of a polarizer formed with a high light transmittance region and a region other than the high light transmittance region according to one embodiment of the present invention.

BEST MODE

Embodiments of the present invention will be described in detail with reference to the accompanying drawings to provide thorough understanding of the invention to those skilled in the art. It should be understood that the present invention may be embodied in different ways and is not limited to the following embodiments.

As used herein to represent a specific numerical range, the expression "X to Y" means "greater than or equal to X and less than or equal to Y (X≤ and ≤Y)".

One aspect of the present invention relates to a polarizing plate. The polarizing plate according to the present invention includes a polarizer and a protective film formed on at least one surface of the polarizer. In one embodiment, the polarizing plate includes a polarizer and a protective film formed on both surfaces of the polarizer. In another embodiment, the polarizing plate includes a polarizer and a protective film formed only on one surface of the polarizer.

The polarizing plate has a high light transmittance region formed at at least part of a plane thereof.

In one embodiment, the polarizing plate consists of a high light transmittance region and a region other than the high light transmittance region (also referred to as a "polarizing region").

Herein, the term "high light transmittance region" refers to a region that is formed on one surface of the polarizer and has a light transmittance of about 60% or more, for example, 60% to 92% (for example, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, or 92%) and a degree of polarization of about 50% or less, for example, 1% to 50% (for example, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50%) in the visible spectrum (for example, at a wavelength of 380 nm to 780 nm). When the polarizing plate is used in an optical display, the high light transmittance region is mounted in a region of the optical display in which a camera is disposed, thereby allowing photographing of an image, such as a picture, therethrough.

Herein, the term "polarizing region" refers to a region that has a typical polarization function and has a light transmittance of about 45% or less, for example, about 10% to 45%, and a degree of polarization of about 90% or more, for example, about 90% to 100%, in the visible spectrum.

The high light transmittance region has a depolarization index of about 2% or less at a wavelength of 550 nm. Herein, the term "depolarization index" refers to a degree of decrease in degree of polarization when polarized light passes through a certain optical system. Within this range of depolarization index, an image photographed with a camera through the high light transmittance region can be clean and clear. Specifically, the high light transmittance region may have a depolarization index of about 0% to about 2% (for example, 0%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, or 1.9%, or 2.0%). In particular, for an optical display having a camera disposed in a display region thereof, placement of the high light transmittance region of the polarizing plate according to the present invention on the camera allows an image photographed with the camera to be clean and clear even when the optical display employs a method that allows a screen not to be displayed on a light-receiving portion of the camera upon photographing with the camera while allowing display of the screen on the light-receiving portion at other times. Herein, the term "display region" refers to a region of the optical display in which light-emitting diodes and the like are disposed to display the screen.

According to the present invention, in addition to designing a high light transmittance region in a polarizing plate for photographing with a camera as in the related art, the high light transmittance region is designed to have a depolarization index of about 2% or less at a wavelength of about 550 nm. The inventors of the present invention confirmed that an image photographed through the high light transmittance region according to the present invention could have significantly improved color quality and clarity, as compared with an image photographed through a high light transmittance region having a depolarization index of greater than about 2% at a wavelength of about 550 nm.

In one embodiment, the high light transmittance region of the polarizing plate may be formed over a portion of the entire area of the polarizer, excluding corners of the polarizer. For example, referring to FIG. 1, the polarizer is formed with a high light transmittance region 10 and a region 20 other than the high light transmittance region, wherein the high light transmittance region 10 is surrounded by the region 20 other than the high light transmittance region.

The polarizer may have a thickness of about 5 μm to 50 μm, specifically about 5 μm to 30 μm. Within this range, the polarizer can be used in the polarizing plate. The polarizer of the polarizing plate is fabricated such that the high light transmittance region has a depolarization index of about 2% or less. Next, a method of fabricating the polarizer will be described.

The polarizer may be fabricated by: dyeing a polyvinyl alcohol film with at least one selected from among iodine and a dichroic dye, followed by stretching; and applying an about 510 nm to 520 nm pulsed laser to a region of the dyed and stretched polyvinyl alcohol film, which will form the high light transmittance region.

First, the dyed and stretched polyvinyl alcohol film is fabricated.

The dyed and stretched polyvinyl alcohol film may be fabricated by dyeing, stretching, cross-linking, and color correction processes. In the method of fabricating the polarizer according to the present invention, the order of performing the dyeing and stretching processes is not particularly restricted. That is, the polyvinyl alcohol film may be stretched after being dyed, may be dyed after being stretched, or may be dyed and stretched at the same time.

The polyvinyl alcohol film may include any typical polyvinyl alcohol film commonly used in fabrication of polarizers. Specifically, the polyvinyl alcohol film may be a film formed of polyvinyl alcohol or a derivative thereof. The polyvinyl alcohol film may have a degree of polymerization of about 1,000 to about 5,000, a degree of saponification of about 80 mol % to 100 mol %, and a thickness of about 1 μm to 30 μm, specifically 3 μm to 30 μm. Within these ranges, the polyvinyl alcohol film may be used in fabrication of thin polarizers.

The polyvinyl alcohol film may be subjected to washing with water and swelling before being subjected to dyeing and stretching. Washing of the polyvinyl alcohol film with water can remove foreign matter from a surface of the polyvinyl alcohol film. Swelling the polyvinyl alcohol film can facilitate dyeing or stretching of the polyvinyl alcohol film. Here, swelling of the polyvinyl alcohol film may be performed by leaving the polyvinyl alcohol film in a swelling bath containing an aqueous solution, as well known to those skilled in the art. The temperature of the swelling bath and the swelling time are not particularly limited. The swelling bath may further contain boric acid, inorganic acid, a surfactant, and the like, and the contents thereof may be properly adjusted.

Dyeing of the polyvinyl alcohol film may be performed by immersing the polyvinyl alcohol film in a dyeing bath containing at least one selected from among iodine and the dichroic dye. In the dyeing process, the polyvinyl alcohol film may be immersed in a dyeing solution. Here, the dyeing solution may be an aqueous solution of at least one selected from among iodine and the dichroic dye. Specifically, iodine is provided in the form of an iodine-based dye. Here, the iodine-based dye may include at least one selected from among potassium iodide, hydrogen iodide, lithium iodide, sodium iodide, zinc iodide, lithium iodide, aluminum iodide, lead iodide, and copper iodide. The dyeing solution may be an aqueous solution containing 1 wt % to 5 wt % of at least one selected from among iodine and the dichroic dye. Within this range, the polarizer can have a degree of polarization in the range specified herein and thus can be used in optical displays.

The temperature of the dyeing bath may range from about 20° C. to 45° C., and the period of time for which the polyvinyl alcohol film is immersed in the dyeing bath may range from about 10 to 300 seconds. Within these ranges, a polarizer having a high degree of polarization can be obtained.

The dyed polyvinyl alcohol film is stretched in a stretching bath to have polarization properties due to orientation of at least one selected from among iodine and the dichroic dye. Specifically, stretching of the dyed polyvinyl alcohol film may be performed by a dry stretching method or a wet stretching method. The dry stretching method may include inter-roll stretching, compression stretching, heated roll stretching, and the like, and the wet stretching method may include stretching the dyed polyvinyl alcohol film in a wet stretching bath containing water at 35° C. to 65° C. The wet stretching bath may further include boric acid to enhance stretching efficiency.

The polyvinyl alcohol film may be stretched to a predetermined elongation. Specifically, the polyvinyl alcohol film may be stretched to a total elongation of about 5 times to about 7 times, specifically about 5.5 times to about 6.5 times. Within this range of elongation, the polyvinyl alcohol film can be prevented from tearing or wrinkling during stretching and a polarizer having a high degree of polarization and a high transmittance can be obtained. Here, the polyvinyl alcohol film may be uniaxially stretched. In addition, stretching of the polyvinyl alcohol film may be performed in a single stage. Alternatively, stretching of the polyvinyl alcohol film may be performed in multiple stages, such as two stages, three stages, and the like, such that a thin polarizer can be obtained without breaking the polyvinyl alcohol film.

Although the polyvinyl alcohol film is stretched after being dyed in the above embodiment, it will be understood that the present invention is not limited thereto and dyeing and stretching of the polyvinyl alcohol film may be performed in the same reaction bath.

The dyed polyvinyl alcohol film may be subjected to cross-linking in a cross-linking bath before or after being stretched. Through the cross-linking process, the polyvinyl alcohol film can be more strongly dyed with at least one selected from among iodine and the dichroic dye. Here, boric acid may be used as a cross-linking agent. A phosphoric acid compound, potassium iodide, and the like may be further contained in the cross-linking bath to enhance cross-linking efficiency.

The dyed and stretched polyvinyl alcohol film may be subjected to color correction in a color-correction bath. In the color correction process, the dyed and stretched polyvinyl alcohol film is immersed in the color-correction bath containing a color-correction solution containing potassium iodide. In this way, the color value of the polarizer can be reduced and iodine anions (I) can be removed from the polarizer, thereby improving durability of the polarizer. The temperature of the color-correction bath may range from about 20° C. to 45° C., and the period of time for which the polyvinyl alcohol film is immersed in the color-correction bath may range from about 10 to 300 seconds.

Then, the pulsed laser at a wavelength of about 510 nm to about 520 nm is applied to a portion of the dyed and stretched polyvinyl alcohol film, thereby fabricating a polarizer partially formed with the high light transmittance region.

The wavelength about 510 nm to about 520 nm pulsed laser can induce transition of iodine and/or the dichroic dye dyed in the polarizer from a ground state to an excited state, thereby decomposing iodine and/or the dichroic dye and thus increasing light transmittance of the portion irradiated therewith.

Specifically, the wavelength about 510 nm to about 520 nm pulsed laser may be a pulsed laser having a wavelength of 510 nm, 511 nm, 512 nm, 513 nm, 514 nm, 515 nm, 516 nm, 517 nm, 518 nm, 519 nm, 520 nm, preferably 515 nm.

The wavelength about 510 nm to about 520 nm pulsed laser is applied at an energy density of about 0.17 $J/cm^2 \cdot a$ pulse or less. Within this range, the high light transmittance region can have a depolarization index of 2% or less while preventing heat-induced carbonization of a processed surface of the polyvinyl alcohol film or a laser hatching phenomenon. Preferably, the wavelength about 510 nm to 520 nm pulsed laser is applied at an energy density of 0.03 $J/cm^2 \cdot a$ pulse to 0.17 $J/cm^2 \cdot a$ pulse.

Herein, the term "energy density" means energy per pulse per unit area of the high light transmittance region of the polarizer.

The wavelength about 510 nm to about 520 nm pulsed laser may be applied for about 1 to 1,000 seconds, for example, about 1 to 100 seconds at each of the wavelengths described above. Within this range, a more neutral and colorless high light transmittance region can be formed without thermal deformation of the polarizer and the protective film by increasing the beam application time or frequency under the aforementioned conditions.

The wavelength about 510 nm to about 520 nm pulsed laser may be applied with a number of scans of 1 to 20. Within this range, a more neutral and colorless high light transmittance region can be formed without thermal deformation of the polarizer and the protective film by increasing the beam application time or frequency under the aforementioned conditions.

Herein, the term "number of scans" refers to the number of times the pulsed laser passes through a specific point for a given mapping level.

The high light transmittance region may be formed by applying the wavelength about 510 nm to about 520 nm pulsed laser to the polarizer. Alternatively, the high light transmittance region may be formed by applying the pulsed laser at an energy density in the range specified herein to a laminate of the polarizer and the protective film formed on at least one surface of the polarizer.

The protective film may include any typical protective film commonly used in polarizers. For example, the protective film may include a protective film formed of at least one selected from among: cellulose resins including triacetyl cellulose and the like; polyester resins including polyethylene terephthalate, polybutylene terephthalate, polyethylene naphthalate, polybutylene naphthalate, and the like; cyclic polyolefin resins, polycarbonate resins; polyethersulfone resins, polysulfone reins, polyamide resins; polyimide resins; polyolefin reins; polyarylate resins; polyvinyl alcohol resins; polyvinyl chloride resins; and polyvinylidene chloride resins.

The protective film may have a thickness of about 10 μm to 100 μm, for example, about 10 μm to 60 μm. Lamination of the protective film on the polarizer may be performed via an adhesive by any typical method known in the art.

Another aspect of the present invention relates to an optical display.

The optical display according to the present invention includes the polarizing plate according to the present invention. Examples of the optical display may include liquid crystal displays, organic light emitting displays, and the like.

MODE FOR INVENTION

Next, the present invention will be described in more detail with reference to some examples. However, it should be noted that these examples are provided for illustration only and are not to be construed in any way as limiting the present invention.

Details of components used in Examples and Comparative Examples were as follows:

(1) Polarizer: A polyvinyl alcohol film (VF-PE3000, Kuraray Co., Ltd., Japan, thickness: 30 μm)

(2) Protective film: A triacetyl cellulose film (KC4UYW, Konica Minolta Inc., Japan, thickness: 40 μm)

Example 1

A polyvinyl alcohol film washed with water was subjected to swelling in a swelling bath containing water at 30° C.

The polyvinyl alcohol film having passed through the swelling bath was treated in a dyeing bath containing an aqueous solution of 3 wt % potassium iodide at 30° C. for 30 to 200 seconds. The polyvinyl alcohol film having passed through the dyeing bath was allowed to pass through a wet cross-linking bath containing an aqueous solution of 3 wt % boric acid at 30° C. to 60° C. The polyvinyl alcohol film having passed through the cross-linking bath was stretched to a total elongation of 6 times in a stretching bath containing an aqueous solution of 3 wt % boric acid at 50° C. to 60° C., thereby fabricating a polarizer. Then, a protective film was bonded to both surfaces of the fabricated polarizer via an adhesive (Z-200, Nippon Gohsei), thereby fabricating a laminate.

The laminate was cut to a predetermined size, followed by applying a 515 nm pulsed laser to a portion of the laminate under conditions shown in Table 1, thereby fabricating a polarizing plate having a high light transmittance region.

Examples 2 to 25

Polarizing plates having a high light transmittance region were fabricated in the same manner as in Example 1 except that a 515 nm pulsed laser was applied under different conditions shown in Tables 1 to 3.

Comparative Example 1

A polarizing plate having a high light transmittance region was fabricated in the same manner as in Example 1 except that a 400 nm to 800 nm pulsed laser was applied under conditions shown in Table 3 instead of applying a 515 nm pulsed laser under conditions shown in Table 1.

Comparative Example 2

A polarizing plate having a high light transmittance region was fabricated in the same manner as in Example 1 except that a 532 nm pulsed laser was applied under conditions shown in Table 3 instead of applying a 515 nm pulsed laser under conditions shown in Table 1.

Comparative Example 3

A polarizing plate having a high light transmittance region was fabricated in the same manner as in Example 1 except that a 515 nm pulsed laser was applied under conditions shown in Table 3 instead of applying a 515 nm pulsed laser under conditions shown in Table 1.

The high light transmittance region of each of the polarizing plates fabricated in Examples and Comparative Examples was evaluated as to the following properties:

(1) Depolarization index (unit: %): A depolarization index of the high light transmittance region of each of the polarizing plates fabricated in Examples and Comparative Examples was measured at a wavelength of 550 nm using an AXOSCAN system.

(2) Light transmittance (unit: %): An average light transmittance of the high light transmittance region of each of the polarizing plates fabricated in Examples and Comparative Examples was measured at a wavelength of 380 nm to 780 nm using a spectrophotometer (V730, JASCO Corporation).

(3) Degree of polarization (unit: %): A degree of polarization of the high light transmittance region of each of the polarizing plates fabricated in Examples and Comparative Examples was measured at a wavelength of 550 nm using a spectrophotometer (V730, JASCO Corporation).

(4) Image clarity through high light transmittance region (visibility evaluation): Considering age and gender, women in their twenties have the best vision. Five women in their twenties who did not use a vision correction device (for example, spectacles) in daily life were selected as a test group. When visual acuity measured by a general vision test method was the same as visual acuity measured through the high light transmittance region of the polarizing plate, the corresponding polarizing plate was rated as "Good", and, when visual acuity measured by a general vision test method was different than visual acuity measured through the high light transmittance region of the polarizing plate, the corresponding polarizing plate was rated as "Poor".

TABLE 1

| | Example | | | | | | | | |
| --- | --- | --- | --- | --- | --- | --- | --- | --- | --- |
| | 1 | 2 | 3 | 4 | 5 | 6 | 7 | 8 | 9 |
| Wavelength of pulsed laser | 515 | 515 | 515 | 515 | 515 | 515 | 515 | 515 | 515 |
| Energy density (J/cm$^2$•a pulse) | 0.07 | 0.09 | 0.1 | 0.12 | 0.14 | 0.15 | 0.17 | 0.05 | 0.07 |
| Pulse repetition rate (Hz) | 500 k | 500 k | 500 k | 500 k | 500 k | 500 k | 500 k | 500 k | 500 k |
| Number of scans (times) | 1 | 1 | 1 | 1 | 1 | 1 | 1 | 5 | 5 |
| Depolarization index | 1.3 | 1.0 | 1.0 | 1.1 | 1.1 | 1.1 | 1.1 | 1.2 | 1.1 |
| Light transmittance | 84.7 | 87.5 | 88.8 | 89.6 | 90.0 | 89.9 | 90.2 | 83.0 | 88.2 |
| Degree of polarization | 8.1 | 4.9 | 3.6 | 2.6 | 2.4 | 2.3 | 2.2 | 9.8 | 4.0 |
| Visibility | Good | Good | Good | Good | Good | Good | Good | Good | Good |

TABLE 2

| | Example | | | | | | | | | |
|---|---|---|---|---|---|---|---|---|---|---|
| | 10 | 11 | 12 | 13 | 14 | 15 | 16 | 17 | 18 | 19 |
| Wavelength of pulsed laser | 515 | 515 | 515 | 515 | 515 | 515 | 515 | 515 | 515 | 515 |
| Energy density ($J/cm^2 \cdot$a pulse) | 0.09 | 0.1 | 0.12 | 0.14 | 0.15 | 0.17 | 0.03 | 0.05 | 0.07 | 0.09 |
| Pulse repetition rate (Hz) | 500 k | 500 k | 500 k | 500 k | 500 k | 500 k | 500 k | 500 k | 500 k | 500 k |
| Number of scans (times) | 5 | 5 | 5 | 5 | 5 | 5 | 10 | 10 | 10 | 10 |
| Depolarization index | 0.9 | 1.0 | 0.9 | 0.9 | 1.1 | 1.6 | 1.4 | 1.0 | 0.9 | 0.9 |
| Light transmittance | 88.8 | 89.8 | 90.36 | 90.0 | 89.6 | 90.9 | 80.2 | 86.2 | 89.3 | 90.1 |
| Degree of polarization | 3.2 | 2.6 | 1.8 | 2.0 | 1.9 | 1.3 | 14.8 | 5.6 | 3.0 | 3.2 |
| Visibility | Good | Good | Good | Good | Good | Good | Good | Good | Good | Good |

TABLE 3

| | Example | | | | | | Comparative Example | | |
|---|---|---|---|---|---|---|---|---|---|
| | 20 | 21 | 22 | 23 | 24 | 25 | 1 | 2 | 3 |
| Wavelength of pulsed laser | 515 | 515 | 515 | 515 | 515 | 515 | 400-800 | 532 | 515 |
| Energy density ($J/cm^2 \cdot$a pulse) | 0.1 | 0.12 | 0.14 | 0.15 | 0.17 | 0.17 | 2.55 | 1.27 | 0.21 |
| Pulse repetition rate (Hz) | 500 k | 500 k | 500 k | 500 k | 500 k | 500 k | 10 | 250 k | 500 k |
| Number of scans (times) | 10 | 10 | 10 | 10 | 10 | 20 | 1 | 1 | 10 |
| Depolarization index | 0.9 | 0.8 | 0.9 | 0.9 | 1.2 | 0.9 | 12.44 | 15.62 | 2.29 |
| Light transmittance | 90.1 | 90.1 | 90.2 | 90.1 | 90.9 | 87.9 | 90.84 | 85.48 | 83.13 |
| Degree of polarization | 1.7 | 1.7 | 1.4 | 1.5 | 1.2 | 1.4 | 33.07 | 15.62 | 8.18 |
| Visibility | Good | Good | Good | Good | Good | Good | Poor | Poor | Poor |

As shown in Tables 1 to 3, the polarizing plates according to the present invention could allow an image photographed through the high light transmittance region to have improved color quality and clarity.

Conversely, the polarizing plates of Comparative Examples 1 to 3, the high light transmittance region of which had a depolarization index of greater than 2%, exhibited poor properties in terms of color quality and clarity of an image photographed through the high light transmittance region, as compared with those of Examples.

It should be understood that various modifications, changes, alterations, and equivalent embodiments can be made by those skilled in the art without departing from the spirit and scope of the invention.

The invention claimed is:

1. A polarizing plate comprising:
a polarizer, fabricated by stretching a polyvinyl alcohol film following staining with iodine and/or dichroic dye; and
a protective film formed on at least one surface of the polarizer,
wherein the polarizer has a high light transmittance region formed at least a portion thereof,
wherein the high light transmittance region is formed by applying a pulsed laser having a wavelength of 510 nm to 520 nm and an energy density of 0.03 $J/cm^2$ per pulse to 0.17 $J/cm^2$ per pulse to a portion of dyed and stretched polyvinyl alcohol film, and the high light transmittance region has decomposed iodine and/or dichroic dye,
wherein the high light transmittance region has a degree of polarization of 1% to 50% at a wavelength of 380 nm to 780 nm and a depolarization index of about 2% or less at a wavelength of about 550 nm.

2. The polarizing plate according to claim 1, wherein the high light transmittance region has a light transmittance of about 60% to about 92%.

3. An optical display comprising the polarizing plate according to claim 2.

4. The polarizing plate according to claim 1, wherein the high light transmittance region is placed on a camera disposed in a display region of an optical display.

5. An optical display comprising the polarizing plate according to claim 4.

6. An optical display comprising the polarizing plate according to claim 1.

* * * * *